(12) United States Patent
Hong et al.

(10) Patent No.: US 12,211,259 B2
(45) Date of Patent: Jan. 28, 2025

(54) QUICKLY EXTRACTION OF MORPHOLOGY CHARACTERIZATION PARAMETERS OF RECYCLED CONCRETE SAND PARTICLES BASED ON DEEP LEARNING TECHNOLOGY

(71) Applicant: Hefei University of Technology, Hefei (CN)

(72) Inventors: Li Hong, Hefei (CN); Zhouliang Yu, Hefei (CN); Binggen Zhan, Hefei (CN); Mingming Li, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 418 days.

(21) Appl. No.: 17/833,923

(22) Filed: Jun. 7, 2022

(65) Prior Publication Data
US 2023/0394806 A1    Dec. 7, 2023

(51) Int. Cl.
*G06T 7/73* (2017.01)
*G06T 5/50* (2006.01)
(Continued)

(52) U.S. Cl.
CPC ............... *G06V 10/82* (2022.01); *G06T 5/50* (2013.01); *G06T 7/85* (2017.01); *G06V 10/7747* (2022.01); *G06V 10/776* (2022.01)

(58) Field of Classification Search
CPC .. G06V 10/82; G06V 10/7747; G06V 10/776; G06V 10/454; G06T 5/50; G06T 7/85; G06T 2207/10028; G06T 2207/20084; G06T 2207/30132; G06T 7/0004; G06T 7/11; G06T 7/60; G06T 5/30; G06T 2207/20224; G06T 5/70; G06T 5/60; G06T 2207/20021; G06T 2207/20081;
(Continued)

(56) References Cited

U.S. PATENT DOCUMENTS

| | | | |
|---|---|---|---|
| 2008/0192987 A1* | 8/2008 | Helgason | G01N 33/24 382/109 |
| 2010/0177118 A1* | 7/2010 | Sytnikov | G06T 11/60 345/619 |

(Continued)

*Primary Examiner* — Siamak Harandi
*Assistant Examiner* — Mehrazul Islam
(74) *Attorney, Agent, or Firm* — Bayramoglu Law Offices LLC (57) ABSTRACT

A method for identifying and extracting characterization parameters of recycled concrete sand particles based on deep learning technology is provided. The method integrates image processing method based on deep learning and quickly recognition of recycled concrete sand particles (RCSP), adopts U-Net semantic segmentation model, develops RCSP data set by inventing a 3D image acquisition platform equipment of recycled concrete sand, in which two CCD industrial cameras are used to collect original multi-dimensional images of the moving RCSP synchronously in the same frame. Secondly, data sets are separated into training set and verification set by 4:1, in which training set are first used to train the U-Net semantic segmentation model to quickly identify the recycled concrete sand, during this process the best training parameters of U-Net semantic segmentation model are determined. Finally, the verification sets are adopted to validate the training model.

6 Claims, 3 Drawing Sheets

Pixel error analysis diagram (51) Int. Cl.
  *G06T 7/11* (2017.01)
  *G06T 7/55* (2017.01)
  *G06T 7/80* (2017.01)
  *G06V 10/774* (2022.01)
  *G06V 10/776* (2022.01)
  *G06V 10/82* (2022.01)

(58) Field of Classification Search
  CPC .......... G06T 2207/20192; G06N 3/048; G06N 3/0464; G06N 3/08
  See application file for complete search history.

(56) References Cited

U.S. PATENT DOCUMENTS

| | | | |
|---|---|---|---|
| 2016/0263624 A1* | 9/2016 | Balthasar | G01N 21/85 |
| 2021/0319561 A1* | 10/2021 | Fang | G06T 7/11 |
| 2022/0092797 A1* | 3/2022 | Song | G06N 3/04 |
| 2022/0245919 A1* | 8/2022 | Sano | G06T 7/0012 |
| 2022/0412867 A1* | 12/2022 | Xu | G01N 33/24 |
| 2023/0145701 A1* | 5/2023 | Parchami | G06N 3/0464 |
| | | | 382/103 |

* cited by examiner

Camera-centric view

FIG. 1A

Pixel error analysis diagram

Training set loss changes

FIG. 3A

Validation set loss changes

QUICKLY EXTRACTION OF MORPHOLOGY CHARACTERIZATION PARAMETERS OF RECYCLED CONCRETE SAND PARTICLES BASED ON DEEP LEARNING TECHNOLOGY

TECHNICAL FIELD

The present invention develops a method based on deep learning technology for the quick segmentation and extraction of morphology characterization parameters of RCSP.

BACKGROUND

With the continuous expansion of global urbanization, sand as a key aggregate in concrete, its use is also increasing. Because sand is a resource with a very slow regeneration rate, many countries are currently facing the problem of natural sand shortage and high price. Therefore, the use of recycled concrete sand generated by the crushing of waste concrete to replace natural sand, has obvious economic and environmental benefits, has an important significance for the realization of sustainable development.

In the morphology analysis of building sand, many researchers found that the closer the sand is to the round, the better the particle shape, the better the corresponding gradation curve and bulk density, thus leading to more economic price and better performance of its products. Compared with natural sand, recycled concrete sand has rough surface, sharp edges and complex sources. The particle morphology of recycled concrete sand from different regions and treated by different equipment also has different differences. The particle morphology of recycled concrete sand not only affects the mix ratio of concrete and mortar products, but also affects the mechanical properties of products. Therefore, it is necessary to known the particle morphology of recycled concrete sand, so as to feedback and adjust equipment, and finally improve the quality of recycled concrete sand.

In the previous studies, the image analysis method is always used to obtain the corresponding sand image to analyze its morphology. In this regard, a number of parameters have been established to evaluate the two-dimensional pattern of sand, such as convexity, roundness, size, aspect ratio, etc., but few studies have been involved in obtaining three-dimensional parameters of sand. In addition, the image analysis method needs to ensure the non-overlap between particles in the detection process, and has high requirements on the quality of light source. At the same time, the change of detection environment has a large impact on the error of experimental measurement results, so it is impossible to achieve efficient detection.

To solve these problems, we invent a method for image recognition and characterization parameters extraction of RCSP based on deep learning technology. By developing a binocular image acquisition system, the present invention uses two binocular cameras to obtain multi-dimensional recycled concrete sand particle image data firstly, then the network model based on U-Net system is trained and finally verified, which can be used to rapidly extracted the morphology characterization parameters of recycled concrete sand particle.

SUMMARY

In order to promote the use of RCSP in engineering more efficiently and accurately, the present invention provides a method to recognition and extraction the morphology characterization parameters of RCSP based on deep learning technology.

The present invention is realized through the following technical schemes:

Step 1. Binocular Camera Calibration:
  (1) "Zhang's calibration method" is used for binocular camera calibration.
  (2) Two industrial cameras are used to take checkerboard photos of different positions and angles, the internal and external parameters, as well as distortion parameters of binocular cameras are obtained by combining the calibration toolbox of MATLAB software.

Step 2. Binocular Image Collection:
  (1) a certain amount of RCSP are dumped into the conveyor belt of the vibration feeder bin, and the transmission speed is controlled by adjusting the vibration frequency, so that the RCSP are evenly dispersed to the end of the conveyor belt and fall into the image collection area in free fall.
  (2) Adjust the acquisition angle, position and light intensity of two industrial cameras.
  (3) Two CCD cameras are used to collect the falling RCSP in the same frame synchronously and transmit them to PC terminal synchronously for image processing.
  (4) Finally, after the RCSP are completely collected and fall into the recycling box, it is considered that the image collection of this batch of recycled concrete sand experimental particles is completed.

Step 3. Processing and Division of Data Set:
  (1) Image samples containing RCSP were selected according to the collected data set.
  (2) The present invention uses image enhancement technology to cut, mirror, rotate, locally enlarge and enhance the original image data.
  (3) Labelme software was used to label and add labels to the RCSP in the original image.

Step 4. Construction of Network Model:
  (1) Based on Pytorch open source neural network framework, the present invention selects U-Net neural network structure to construct semantic segmentation model of RCSP.
  (2) After the original image is input into the U-Net network model, the size of the convolution image is changed to 256×256 by two convolution kernels with a size of 3×3. and the edge padding which assumed as 1.0 is used to keep the size of the convolution image unchanged, then it was activated by a ReLU function, and the size of the convolution image is changed to 256×256 by a size of 2×2 maximum pooling. This is a complete down-sampling process. The following three down-sampling operations are the same as above. In the down-sampling process, the number of channels of the image is continuously doubled from 64 channels to 1024 channels. After the above down-sampling is completed, splicing and up-sampling are carried out synchronously. Splicing refers to the fusion of shallow information acquired in feature extraction and deep information in up-sampling, that is to say, the features of shallow information are refused and splicing during up-sampling to improve the learning accuracy of the network. The up-sampling part is also called extended network, which enlarges the size of the image continuously to extract deep information. Four up-sampling parts are used continuously. In the process of up-sampling, the number of channels in the image is halved continuously, which is contrary to the change of channel number in the process of feature extraction. In the experiment, the size of the final segmentation image is 512×512, which is consistent with the size of the input image, and the number of channels is 2 (background image and recycled concrete sand segmentation target).

Step 5. Model Training and Verification:
  (1) After the model is developed, the enhanced image data is used in the experiment according to a certain proportion of data sets. Firstly, the images of the training set and their corresponding label graphs are substituted into the training network to obtain the optimal weight.
  (2) The validation set was adopted to verify the accuracy and efficiency of the model, the evaluation indexes were introduced to evaluate the accuracy of the proposed model prediction and recognition results.

Step 6 Extraction of Particle Morphology Characterization Parameters:
  (1) The identification method uses open source OpenCV computer vision library for feature extraction of segmented images. Gaussian filter is used to eliminate some small noises in the early segmentation process, and then the image is grayscale and binarization to facilitate subsequent image processing operations.
  (2) After the binarization operation is completed, the size of the kernel is controlled, and the middle cavity of some particles in the image is filled by the image processing method of expansion and corrosion. The edge detection is carried out by watershed algorithm to separate the regenerated RCSP in the image in contact with each other.
  (3) After the image processing of the segmentation result graph is completed, the contour extraction function FindContours( ) in OpenCV library is used to extract the edge contour of the RCSP. The geometric morphology parameters of RCSP are extracted by different algorithms.
  (4) Convert the pixel size of the image to the actual size.

Compared with the prior art, the present invention has the following advantages:
  (1) Based on deep learning method, the present invention adopts U-Net semantic segmentation model and combines dynamic image processing method to realize the segmentation of recycled concrete sand particle image and rapid extraction of morphology characterization parameters.
  (2) The identification method introduces Accuracy, Recall, comparison IoU and F1-score index evaluation system.
  (3) Traditional image analysis method needs to ensure non-overlap between particles in the detection process. The present invention can effectively ensure the separation of recycled sand particles by using a vibrating feeder to collect images in the process of RCSP falling and then combining with watershed algorithm.
  (4) In previous studies, results on 3D parameters of recycled concrete sand are rarely included. Meanwhile, the image method that always adopted to extract the parameters before has high requirements on the quality of light source, and changes in detection environment also have a great impact on experimental results. However, the present invention herein uses two binocular cameras to obtain multi-dimensional images of recycled concrete sand is efficiency and accuracy without the influence of environment. based on the deep learning technology, the presented model is trained using the large data set, and the best learning rate for the training model is determined, then the verified results shows that the method can quickly and effectively extracts the characterization parameters of recycled concrete sand with high accuracy.

DETAILED DESCRIPTION OF THE EMBODIMENTS

The technical scheme of the present invention is explained below in combination with the attached drawings, but is not limited to this. Any modification or equivalent replacement of the technical scheme of the present invention without deviating from the spirit and scope of the technical scheme of the present invention shall be included in the protection scope of the present invention.

Figure 1A:
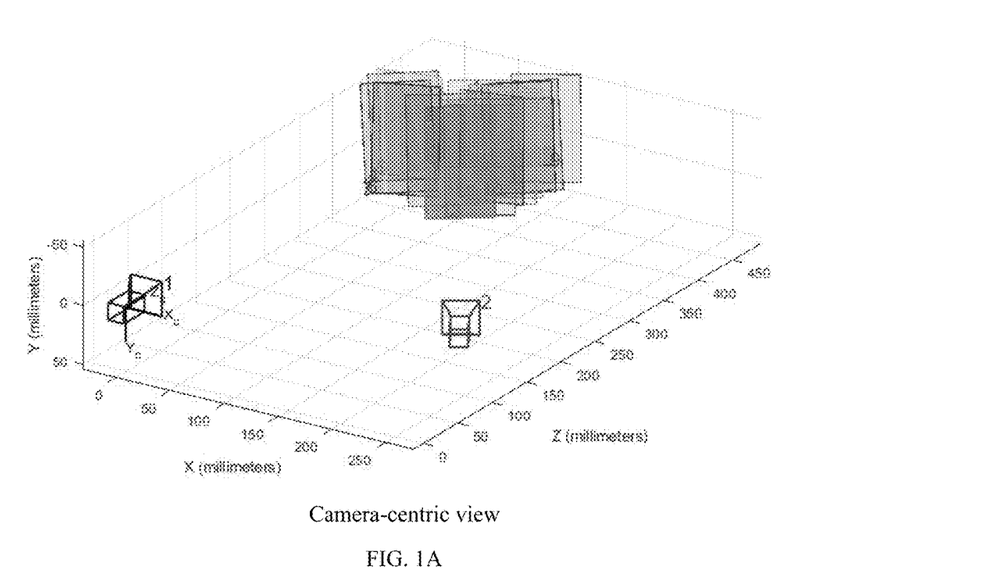
FIG. 1A and FIG. 1B show the calibration parameter information of MATLAB.
Figure 1B:
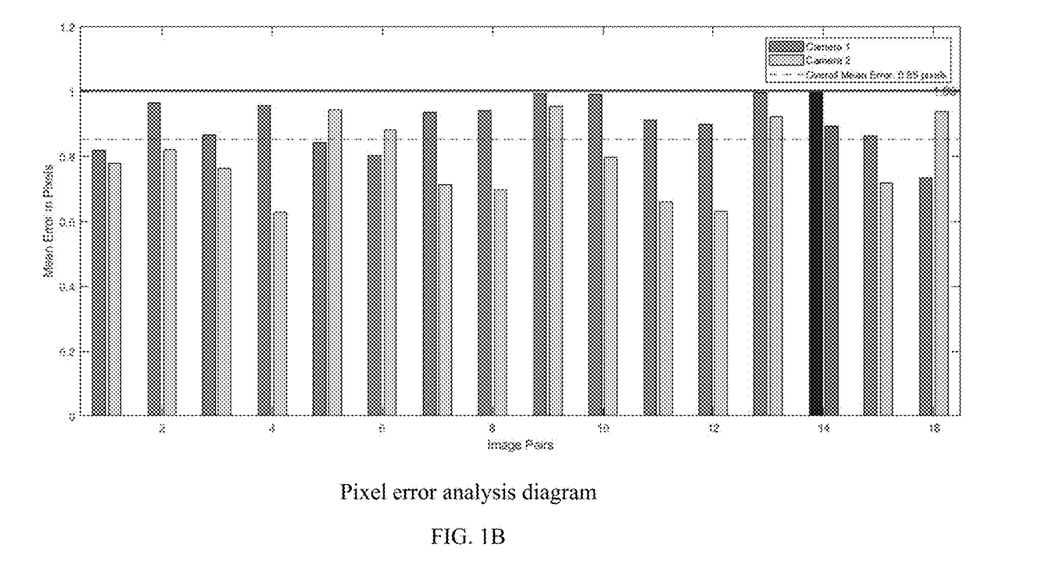

The present invention provides a deep learning based segmentation and identification method of RCSP and extraction of multidimensional characterization parameters. By building a binocular image acquisition system of recycled concrete sand, a binocular camera is used to obtain multi-dimensional image data of RCSP. By training U-Net semantic segmentation network model and combining with dynamic image processing method, the image segmentation and morphology characterization parameters of RCSP can be quickly extracted. Specific optimization examples are as follows:

Step 1. Binocular Camera Calibration:
  (1) In the experiment, "Zhang's calibration method" was used to calibrate the binocular camera: the checkerboard was calibrated by printing black and white. The size of the checkerboard was 10×7, and the size of the single checkerboard was a cube with side length of 11 mm.
  (2) After the completion of the calibration board, two industrial cameras were used to take checkerboard photos of different positions and angles, and the internal and external parameters and distortion parameters of binocular camera were obtained by combining the calibration toolbox of MATLAB software, which were used for the subsequent correction of binocular image and generation of depth image by combining OpenCV. FIG. 1A and FIG. 1B are the specific camera parameter information calibrated by MATLAB, and table 1 shows the obtained internal and external parameters and distortion parameters of binocular camera.

TABLE 1

Internal and external parameters and distortion parameters of binocular camera

| Cam_matrix_left | | | Cam_matrix_right | | | Distortion_left (k1, k2, p1, p2, k3) | Distortion_right (k1, k2, p1, p2, k3) | Rotation_matrix | | | Translation_matrix |
|---|---|---|---|---|---|---|---|---|---|---|---|
| 3352 | 0 | 0 | 3394 | 0 | 0 | −0.3 | −0.2 | 0.9 | 0.0 | −0.5 | −264.7 |
| −2.0 | 3342 | 0 | 7 | 3398 | 0 | −1.9 | −5.1 | 0.0 | 1.0 | 0.0 | 10.6 |
| 630 | 624 | 1 | 1081 | 566 | 1 | 27.7 | 50.0 | 0.5 | 0.0 | 0.9 | 68.0 |
| | | | | | | 0.0 | 0.0 | | | | |
| | | | | | | 0.0 | 0.0 | | | | |

Step 2. Binocular Image Collection:

(1) Experiment 500 g of RCSP in a vibrating feeder bin conveyor belt, by adjusting the frequency control transfer speed, make the RCSP evenly dispersed to the conveyor belt to end and make free fall down into image acquisition area.

(2) Adjust the acquisition Angle, position and light source intensity of the two industrial cameras. Table 2 shows the specific setting parameters of the camera and light source.

TABLE 2

Specific setting parameters of camera and light source

| Set parameters | Unit | The numerical |
|---|---|---|
| The frame rate captured | Fps | 150 |
| Time of exposure | mm | 800 |
| Gamma value | API | 1.18 |
| Brightness | Nits | 50 |
| Area source voltage | V | 3.6 |
| Distance between the cameras | mm | 264.66 |
| Left/right camera Angle | mm | 45°/90° |
| Distance from camera to light source | mm | 52.56 |

(3) In the experiment, the falling RCSP are collected synchronously in the same frame and transmitted synchronously to the PC terminal for image processing. Finally, when the RCSP are completely collected and fall into the recycling box, the image of this batch of recycled concrete sand experimental particles is collected completely.

Step 3. Processing and Division of Data Set:

(1) Image samples containing RCSP were selected according to the collected data set.

(2) A total of 116 original images of recycled concrete sand were collected in this experiment. Image enhancement technology was used to cut, mirror, rotate and enlarge the original images, so that the original image data was enhanced to 3244.

(3) For the training set and verification set in the data set, Labelme was used to mark the regenerated sand particles in the image as red, while other backgrounds were marked as black, so as to facilitate the subsequent image substitute into the network for training.

Step 4. Construction of Network Model:

(1) The experiment is based on Pytorch open source neural network framework, and uses U-Net neural network structure to construct semantic segmentation model of RCSP. Table 3 shows the selected network parameters.

TABLE 3

Network parameters

| Model | Choice |
|---|---|
| Activation function | ReLU |
| Loss function | The cross entropy |
| Learning rate adjustment | Piecewise constant attenuation |
| Optimizer | Adam |

Figure 2:
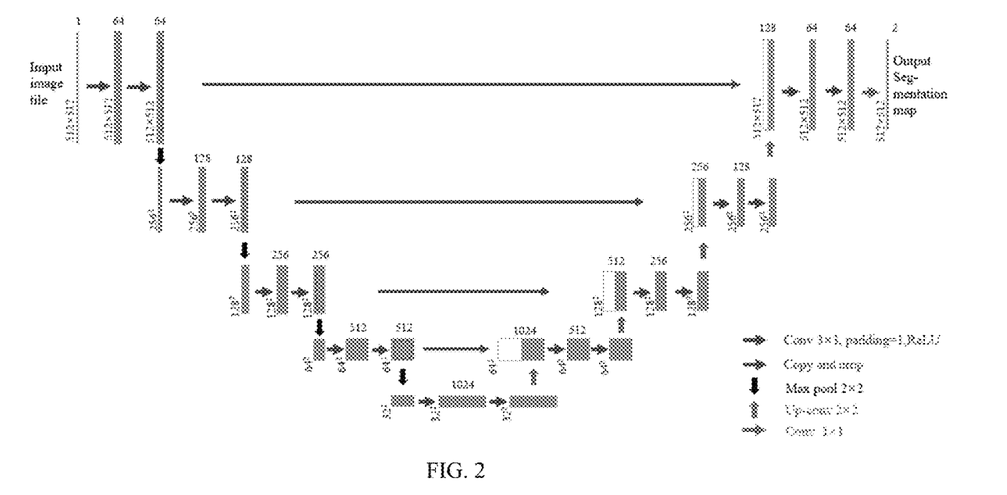
FIG. 2 shows the U-Net network structure diagram.
Figure 3A:
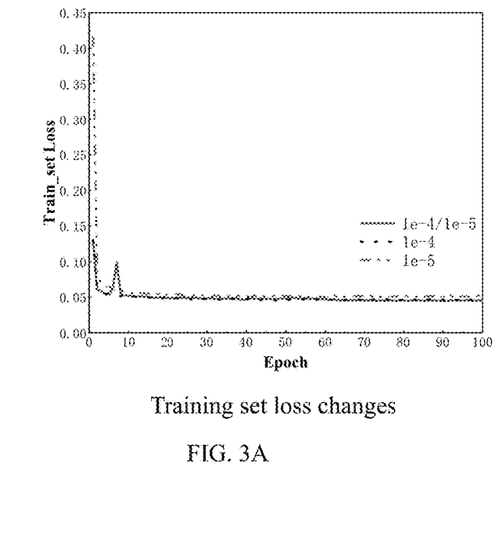
FIG. 3A and FIG. 3B show the loss curve at different learning rates.
Figure 3B:
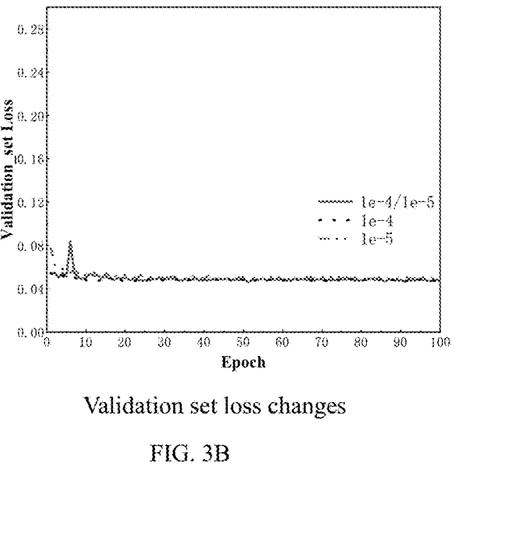

(2) After the original image is input into the U-Net network model, the size of the convolution image is changed to 256×256 by two convolution kernels with a size of 3×3, and the edge padding=1 is used to keep the size of the convolution image unchanged, and then activated by a ReLU function. Finally, the size of the convolution image is changed to 256×256 by a size of 2×2 maximum pooling. This process is a complete down-sampling. The following three down-sampling operations are the same as above. In the down-sampling process, the number of channels of the image is continuously doubled from 64 channels to 1024 channels. After the down-sampling is completed, splicing and up-sampling are carried out synchronously. (Splicing refers to the fusion of shallow information acquired in feature extraction and deep information in up-sampling, that is, the features of shallow information are fused and splicing during up-sampling to improve the learning accuracy of the network. The up-sampling part is also called extended network, which enlarges the size of the image continuously to extract deep information.) Four up-sampling parts are used continuously, In the process of up-sampling, the number of channels in the image is halved continuously, which is contrary to the change of channel number in the process of feature extraction. In the experiment, the size of the final segmentation image is 512×512, which is consistent with the size of the input image, and the number of channels is 2 (background image and recycled concrete sand segmentation target), FIG. 2 shows the structure of U-Net network used Step 5. Model Training and Verification:

(1) After the model was built, the experiment divided the enhanced 3200 image data into data sets according to the ratio of 9:1, among which 2880 were training sets, 320 verification sets and 44 test sets. Firstly, 2880 images of the training set and their corresponding label images are substituted into the training network to obtain the optimal weight. FIG. 3A and FIG. 3B show the change process of Loss function over time in the training set and verification set in 100 training cycles, when the learning rate is 1E-4, 1E-5 and the experimental design scheme.

Figure 4:
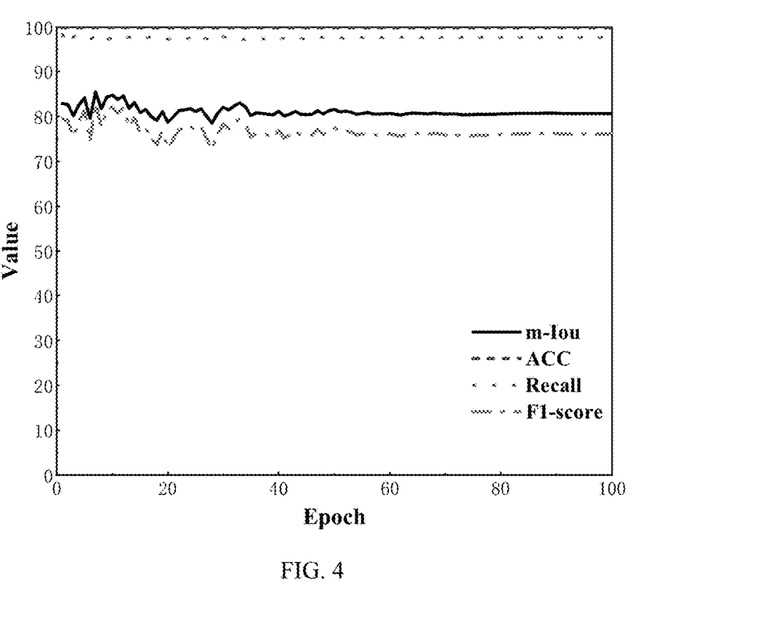
FIG. 4 shows the change curves of different evaluation indexes in the validation set.

(2) 320 verification sets were substituted into the neural network to verify the performance of the model, and 44 test sets were finally substituted into the neural network. The present invention introduces an evaluation index to evaluate the accuracy of network model prediction and recognition results. FIG. 4 shows the changes of the average union ratio of various indicators in the validation set under the optimal learning rate adjustment scheme, including M-IOU, Recall, F1-Score and Accuracy ACC.

Step 6. Extraction of Particle Characterization Parameters:

(1) Invent the use of open source OpenCV computer vision library for feature extraction of segmented images. Firstly, gaussian filter is used to eliminate some small noises in the early segmentation process, and then the image is grayscale and binarization to facilitate subsequent image processing operations.

(2) After the binarization operation is completed, the size of the kernel is controlled, and the central cavity of some particles in the image is filled by the image processing method of expansion before corrosion. Finally, the edge detection is carried out by watershed algorithm to separate the regenerated sand particles in contact with each other in the image.

(3) After the image processing of the segmentation result graph is completed, the contour extraction function FindContours( ) in the OpenCV library is used to extract the edge contour of the separated RCSP. Finally, the geometric morphology parameters of RCSP are extracted by different algorithms. Table 4 is the characterization parameters of recycled concrete sand particles determined in the experiment, Table 5 shows geometric parameters and corresponding algorithm implementation.

TABLE 4

Characterization parameters of recycled concrete sand

| Parameter name | Symbol | Algorithm implementation |
|---|---|---|
| Length-diameter ratio | $H_{min}/W_{min}$ | / |
| Circularity | R | $R = 4\pi S/p^2$ |
| Convexity | $C_0$ | $C_0 = S/S_h$ |
| Volume | V | $V = \pi TW_{min}H_{min}/6$ |
| Degree of sphericity | $S_P$ | $S_P = D_S/D_P$ |

(4) After completing the training of the segmentation network model of recycled concrete sand, different batches of RCSP were segmented and extracted. Finally, geometric morphology parameters and characterization parameters were extracted from the segmented images of RCSP. Table 6 shows the pixel values of geometric morphology parameters of extracted part of RCSP, and Table 7 shows the pixel values of characterization parameters of corresponding RCSP.

(5) The parameters extracted in the experiment are all in pixels. In the final image processing process, the calibration results of the previous binocular camera are used to obtain the proportion relationship between pixel size and actual size through the known chess grid size, and finally achieve the conversion of pixel value to the actual size. Table 8 shows the actual size of geometric parameters and characterization parameters of RCSP after scaling.

TABLE 5

Geometric parameters and algorithm realization of recycled concrete sand

| Parameter name | Symbol | Algorithm implementation |
|---|---|---|
| Area | S | CV.ContourArea |
| Perimeter | P | CV.Arclength |
| Minimum width of the enclosing rectangle | $W_{min}$ | DrawCounTour is used to draw the minimum outer rectangle graph first and then calculate |
| Minimum height of the enclosing rectangle | $H_{min}$ | / |
| Maximum width of the outer rectangle | $W_{max}$ | CV.BoundingRect |
| Maximum height of the outer rectangle | $H_{max}$ | CV.BoundingRect |
| Minimum area of the circumscribed circle | $C_{min}$ | CV.MinEnclosingCircle |
| Ellipse fitting area | E | CV.FitEllipse |
| Convex hull area | $S_h$ | CV.ConvexHull |
| Equal area circle diameter | $D_S$ | / |
| Isoperimetric circle diameter | $D_P$ | / |
| Thickness | T | 3D coordinate difference calculation |
| Constant volume ball diameter | $S_b$ | / |

TABLE 6

Pixel values of geometric morphology parameters of RCSP

| Number | S | P | $W_{min}$ | $H_{min}$ | $W_{max}$ | $H_{max}$ | $C_{min}$ | E | $S_h$ | $D_S$ | $D_P$ | T | $S_b$ |
|---|---|---|---|---|---|---|---|---|---|---|---|---|---|
| 1 | 305.5 | 73.2 | 14.0 | 27.0 | 15.0 | 28.0 | 592.7 | 343.3 | 320.0 | 19.7 | 23.3 | 10.0 | 7.8 |
| 2 | 409.0 | 87.6 | 20.0 | 32.0 | 19.0 | 34.0 | 874.5 | 441.0 | 438.0 | 22.8 | 27.9 | 19.6 | 11.6 |
| 3 | 274.0 | 67.5 | 18.0 | 21.0 | 19.0 | 22.0 | 547.2 | 309.5 | 285.5 | 18.7 | 21.5 | 10.3 | 7.9 |
| 4 | 246.0 | 70.3 | 18.0 | 24.0 | 18.0 | 25.0 | 565.2 | 347.1 | 267.0 | 17.7 | 22.4 | 40.0 | 12.9 |
| 5 | 563.0 | 95.3 | 17.0 | 36.0 | 28.0 | 31.0 | 879.1 | 606.9 | 584.5 | 26.8 | 30.3 | 12.7 | 9.9 |
| 6 | 497.5 | 95.5 | 1.0 | 42.0 | 30.0 | 30.0 | 1069.2 | 534.7 | 525.5 | 25.2 | 30.4 | 17.4 | 4.5 |
| 7 | 258.5 | 62.9 | 15.0 | 22.0 | 16.0 | 23.0 | 408.2 | 259.2 | 266.0 | 18.1 | 20.0 | 18.9 | 9.2 |
| 8 | 439.0 | 86.4 | 18.0 | 31.0 | 23.0 | 30.0 | 773.2 | 458.2 | 458.5 | 23.6 | 27.5 | 28.7 | 12.6 |
| 9 | 351.5 | 73.7 | 19.0 | 24.0 | 20.0 | 25.0 | 531.8 | 370.3 | 365.5 | 21.2 | 23.5 | 26.3 | 11.4 |
| 10 | 895.0 | 120.4 | 33.0 | 36.0 | 34.0 | 37.0 | 1352.7 | 990.3 | 941.0 | 33.8 | 38.3 | 4.7 | 8.9 |
| ... | ... | ... | ... | ... | ... | ... | ... | ... | ... | ... | ... | ... | ... |
| 464 | 383.0 | 76.8 | 13.0 | 30.0 | 24.0 | 24.0 | 524.4 | 401.2 | 403.5 | 22.1 | 24.4 | 22.4 | 10.3 |
| The average | 498.8 | 88.4 | 18.3 | 31.4 | 23.8 | 30.3 | 849.4 | 536.7 | 521.5 | 24.6 | 28.1 | 24.9 | 10.9 |

TABLE 7

Pixel values of characterization parameters of RCSP

| Number | $W_{min}/H_{min}$ | $T/H_{min}$ | R | Co | V | $S_p$ |
|---|---|---|---|---|---|---|
| 1 | 0.54 | 0.36 | 0.72 | 0.89 | 1986.44 | 0.85 |
| 2 | 0.56 | 0.58 | 0.67 | 0.93 | 6564.02 | 0.82 |
| 3 | 0.86 | 0.47 | 0.76 | 0.89 | 2034.43 | 0.87 |
| 4 | 0.72 | 1.60 | 0.63 | 0.71 | 9039.30 | 0.79 |
| 5 | 0.90 | 0.41 | 0.78 | 0.93 | 4067.07 | 0.88 |
| 6 | 1.00 | 0.58 | 0.69 | 0.93 | 382.12 | 0.83 |
| 7 | 0.70 | 0.82 | 0.82 | 1.00 | 3271.13 | 0.91 |
| 8 | 0.77 | 0.96 | 0.74 | 0.96 | 8371.94 | 0.86 |
| 9 | 0.80 | 1.05 | 0.81 | 0.95 | 6265.45 | 0.90 |
| 10 | 0.92 | 0.13 | 0.78 | 0.90 | 2931.86 | 0.88 |
| ... | ... | ... | ... | ... | ... | ... |
| 464 | 1.00 | 0.93 | 0.82 | 0.95 | 4562.72 | 0.90 |
| The average | 0.80 | 0.90 | 0.77 | 0.93 | 6560.11 | 0.88 |

TABLE 8

Conversion between pixel size and actual size of RCSP

| The parameter | The average of pixel | The actual numerical |
|---|---|---|
| $S/mm^2$ | 305.5 | 4.11 |
| P/mm | 73.2 | 8.78 |
| $W_{min}$/mm | 14.0 | 1.68 |
| $H_{min}$/mm | 27.0 | 3.24 |
| $W_{max}$/mm | 15.0 | 1.80 |
| $H_{max}$/mm | 28.0 | 3.36 |
| $C_{min}/mm^2$ | 592.7 | 7.71 |
| $E/mm^2$ | 343.3 | 4.46 |
| $S_h/mm^2$ | 320.0 | 4.16 |
| $D_S$/mm | 19.7 | 2.36 |
| $D_p$/mm | 23.3 | 2.80 |
| T/mm | 10.0 | 1.20 |
| $S_b$/mm | 7.8 | 0.94 |
| $V/mm^3$ | 4562.72 | 7.08 |

The deep learning-based recycled concrete sand image recognition and particle characterization extraction method of the present invention can be widely used in specific engineering projects. In the scheme, a binocular camera is used to obtain multi-dimensional recycled concrete sand particle image data. Training U-Net semantic segmentation network model combined with dynamic image processing method can realize segmentation of recycled concrete sand particle image and quick extraction of morphology characterization parameters.

The above are preferred embodiments of the present invention, which does not limit the patent scope of the present invention. Any equivalent structure or process transformation made by using the description of the present invention and the attached drawings, or directly or indirectly applied in the relevant technical field, is also included in the patent protection scope of the present invention.

What is claimed is:

1. A sort of a quickly extraction of morphology characterization parameters of recycled concrete sand particles (RCSPs) based on a deep learning technology, comprising the following steps:
   step 1: binocular camera calibration;
   step 2: binocular image collection;
   step 3: processing and division of a data set;
   step 4: construction of a network model;
   step 5: model training and verification; and
   step 6: extraction of particle morphology characterization parameters, wherein step 6: extraction of the particle morphology characterization parameters, comprises the following specific steps:
   (1) using an open source computer vision (OpenCV) library for a feature extraction of segmented images; using a Gaussian filter to eliminate small noises in an early segmentation process, and then gray-scaling and binarizing the segmented image to facilitate subsequent image processing operations;
   (2) after a binarization operation is completed, controlling a size of a kernel, and filling a middle cavity of particles in the segmented image by an image processing method of expansion and corrosion; carrying out an edge detection by a watershed algorithm to separate regenerated RCSPs in the segmented image in contact with each other;
   (3) after an image processing of a segmentation result graph is completed, using a contour extraction function FindContours( ) in the OpenCV library to extract an edge contour of the RCSPs; extracting geometric morphology parameters of the RCSPs by different algorithms; and
   (4) converting a pixel size of the segmented image to an actual size.

2. The sort of the quickly extraction of the morphology characterization parameters of the RCSPs based on the deep learning technology according to claim 1, wherein step 1: binocular camera calibration, comprises the following specific steps:
   (1) using "Zhang's calibration method" for the binocular camera calibration; and
   (2) using two industrial cameras to take checkerboard photos of different positions and different angles, obtaining internal and external parameters and distortion parameters of binocular cameras by combining a calibration toolbox of a MATLAB software.

3. The sort of the quickly extraction of the morphology characterization parameters of the RCSPs based on the deep learning technology according to claim 1, wherein step 2: binocular image collection, comprises the following specific steps:
   (1) dumping at least a portion of the RCSPs into a conveyor belt of a vibration feeder bin, and controlling a transmission speed by adjusting a vibration frequency of the vibration feeder bin, evenly dispersing the RCSPs to an end of the conveyor belt and the RCSPs fall into an image collection area in a free fall;
   (2) adjusting an acquisition angle, a position and a light intensity of each of the two industrial cameras;
   (3) using two charge coupled device (CCD) cameras to collect the RCSPs being falling in the same frame synchronously and transmitting the RCSPs being falling to a PC terminal synchronously for an image processing; and
   (4) after the RCSPs are completely collected and fall into a recycling box, completing an image collection of a present batch of the RCSPs.

4. The sort of the quickly extraction of the morphology characterization parameters of the RCSPs based on the deep learning technology according to claim 1, wherein step 3: processing and division of the data set, comprises the following specific steps:
   (1) selecting image samples containing the RCSPs according to a collected data set;
   (2) using an image enhancement technology to cut, mirror, rotate, locally enlarge and enhance original image data; and (3) using a Labelme software to label and add labels to the RCSPs in an original image of the original image data.

5. The sort of the quickly extraction of the morphology characterization parameters of the RCSPs based on the deep learning technology according to claim 1, wherein step 5: model training and verification, comprises the following specific steps:
(1) after the network model is developed, using enhanced image data according to a proportion of data sets; substituting images of a training set and label graphs corresponding the images of the training set into a training network to obtain an optimal weight; and
(2) adopting a validation set to verify an accuracy and an efficiency of the network model, introducing evaluation indexes to evaluate an accuracy of model prediction and recognition results.

6. A sort of a quickly extraction of morphology characterization parameters of recycled concrete sand particles (RCSPs) based on a deep learning technology, comprising the following steps:
step 1: binocular camera calibration;
step 2: binocular image collection;
step 3: processing and division of a data set;
step 4: construction of a network model;
step 5: model training and verification; and
step 6: extraction of particle morphology characterization parameters
wherein step 4: construction of the network model, comprises the following specific steps:
(1) based on a PyTorch open source neural network framework, selecting a U-Net neural network structure to construct a semantic segmentation model of the RCSPs; and
(2) after the original image is input into a U-Net network model, changing a size of a convolution image to 256×256 by two convolution kernels with a size of 3×3 and using an edge padding assumed as 1.0 to keep the size of the convolution image unchanged, then activating the U-Net network model by a ReLU function, and changing the size of the convolution image to 256×256 by a maximum pooling with a size of 2×2, as a complete down-sampling process; the following three down-sampling operations are the same as the complete down-sampling process; wherein in the complete down-sampling process, a number of channels of the convolution image is continuously doubled from 64 channels to 1024 channels; after the complete down-sampling process is completed, performing splicing and up-sampling synchronously, wherein splicing refers to a fusion of shallow information acquired in a feature extraction and deep information in the up-sampling, wherein features of the shallow information are refused and spliced during the up-sampling to improve a learning accuracy of a network; an up-sampling part is called an extended network, and the extended network enlarges a size of the convolution image continuously to extract the deep information; wherein four up-sampling parts are used continuously; in a process of the up-sampling, the number of the channels of the image is halved continuously, contrary to a change of the number of the channels in a process of the feature extraction; a size of a final segmentation image is 512×512, and the size of the final segmentation image is consistent with a size of an input image, and a number of channels of the final segmentation image is 2, the final segmentation image comprises a background image and a recycled concrete sand segmentation target.

* * * * *